(12) United States Patent
Abdulkhair et al.

(10) Patent No.: US 12,453,964 B1
(45) Date of Patent: Oct. 28, 2025

(54) METHOD FOR HYDROGEN GENERATION USING NANOCOMPOSITE

(71) Applicant: IMAM MOHAMMAD IBN SAUD ISLAMIC UNIVERSITY, Riyadh (SA)

(72) Inventors: Babiker Yagoub Elhadi Abdulkhair, Riyadh (SA); Mohamed Nady Abd El-Hameed Ibrahim, Riyadh (SA); Mohamed Khairy Omran, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/214,524

(22) Filed: May 21, 2025

(51) Int. Cl.
| | |
|---|---|
| *B01J 27/25* | (2006.01) |
| *B01J 23/02* | (2006.01) |
| *B01J 35/40* | (2024.01) |
| *B01J 35/45* | (2024.01) |
| *B01J 35/61* | (2024.01) |
| *B01J 35/63* | (2024.01) |
| *B01J 35/64* | (2024.01) |
| *B01J 37/04* | (2006.01) |
| *B01J 37/08* | (2006.01) |
| *B01J 37/34* | (2006.01) |
| *C01B 3/06* | (2006.01) |
| *C01B 21/06* | (2006.01) |
| *C01B 33/24* | (2006.01) |

(52) U.S. Cl.
CPC ............ *B01J 27/25* (2013.01); *B01J 23/02* (2013.01); *B01J 35/40* (2024.01); *B01J 35/45* (2024.01); *B01J 35/613* (2024.01); *B01J 35/615* (2024.01); *B01J 35/633* (2024.01); *B01J 35/647* (2024.01); *B01J 37/04* (2013.01); *B01J 37/08* (2013.01); *B01J 37/342* (2013.01); *C01B 3/065* (2013.01); *C01B 21/0605* (2013.01); *C01B 33/24* (2013.01)

(58) Field of Classification Search
CPC ........ B01J 35/45; B01J 35/647; B01J 35/615; B01J 35/613; B01J 35/633; B01J 35/40; B01J 23/02; B01J 37/08; B01J 37/04; B01J 37/342; B01J 37/343; C01B 3/065; C01B 21/0605; C01B 33/24
See application file for complete search history.

(56) References Cited

FOREIGN PATENT DOCUMENTS

| | | |
|---|---|---|
| CN | 109701581 A | 5/2019 |
| CN | 114433165 B | 9/2024 |
| WO | 2016/095478 A1 | 6/2016 |

OTHER PUBLICATIONS

Alshammari et al., Materials, (2023), v.16, p. 4218 (1-15).*
Khulaif Alshammari, et al., "Synthesis of Sulfur@g-C3N4 and CuS@g-C3N4 Catalysts for Hydrogen Production from Sodium Borohydride", Materials 2023, vol. 16, 4218, Jun. 7, 2023, 15 pages.
Jiangfeng Xu, et al., "The well-designed wollastonite-ZnIn2S4 composite photocatalysts for efficient hydrogen production", Progress in Natural Science: Materials International, Jan. 15, 2025, Excerpts only, 7 pages.

* cited by examiner

*Primary Examiner* — Yong L Chu
(74) *Attorney, Agent, or Firm* — Oblon, McClelland, Maier & Neustadt, L.L.P.

(57) ABSTRACT

A method of generating hydrogen includes reacting sodium borohydride with water in the presence of a $Cu_2(OH)_3NO_3/CaSiO_3/g\text{-}C_3N_4$ nanocomposite to hydrolyze sodium borohydride and generate hydrogen. The nanocomposite used is fabricated by mixing $CaSiO_3$, $g\text{-}C_3N_4$, and a copper salt in a glycol solvent to form a mixture and further microwaving the mixture to obtain the $Cu_2(OH)_3NO_3/CaSiO_3/g\text{-}C_3N_4$ nanocomposite.

20 Claims, 4 Drawing Sheets

METHOD FOR HYDROGEN GENERATION USING NANOCOMPOSITE

BACKGROUND

Technical Field

The present disclosure is directed towards a method for hydrogen generation using a $Cu_2(OH)_3NO_3/CaSiO_3/g\text{-}C_3N_4$ nanocomposite. The present disclosure is also related to a process of fabricating the $Cu_2(OH)_3NO_3/CaSiO_3/g\text{-}C_3N_4$ nanocomposite. More specifically, the present disclosure is related to hydrolyzing sodium borohydride in the presence of water catalyzed by the $Cu_2(OH)_3NO_3/CaSiO_3/g\text{-}C_3N_4$ nanocomposite to generate hydrogen.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Increasing energy demands leads to the rapid depletion of fossil fuel sources and a notable increase in atmospheric $CO_2$ emissions. Therefore, there has been an increasing desire to switch to renewable sources of energy, which has gained a considerable attention due to its replenishable ability in nature and minimal hazardous emissions associated. Additionally, renewable sources of energy promise a more sustainable and ecologically friendly future, since the demand of carbon-intensive fossil fuels is eliminated, which in turn suppresses the resulting carbon emissions. Therefore, the approach of switching to renewable energy resources helps tackle various environmental issues such as pollution and global warming, and advancement towards clean energy is beneficial for sustainable growth and development.

Among many types of renewable energy sources, hydrogen has emerged as one of the most promising energy carriers due to its high energy density (142 megajoules per kilogram (MJ/kg)), non-toxicity, and environmentally friendly nature. It is notable that the energy density of hydrogen is much higher than that of liquid hydrocarbons (47 MJ/kg). In addition, hydrogen can easily be stored in various forms according to the storage techniques, for example, in a molecular form in carbon-based materials, in an atomic form in metal hydrides, in an anionic form in borohydrides, as well as in a liquid form in pressure vessels and liquid hydrogen tanks. High-pressure hydrogen storage and liquefaction to store hydrogen in a liquid form suffers disadvantages from high cylinder investments and maintenance costs, high gas compression energy consumption, and easy gas leakage at high pressure. Metal hydrides hydrogen storage in an anionic form, on the other hand, has many benefits such as high hydrogen storage capacity, excellent thermal and chemical stability, perfect hydrolysis controllability, and the environmentally friendly nature of the reaction products, despite the existence of limitations such as high temperature requirements and air sensitivity for hydrogen generation by thermal breakdown. Borohydride, particularly sodium borohydride ($NaBH_4$), is considered as a valuable candidate for on-demand hydrogen production. Reports suggest that hydrolysis of $NaBH_4$ enhances significantly by use of noble metals as catalysts [See: Tianhao Wang; Jiashun Xi; Hang Sheng; Yi Zhao. *Mechanism of catalytic performance enhancement for hydrolysis of sodium borohydride by modification of cobalt boride with metals: A review. Int. J. Hydrogen Energy* 2024, 85, 120-134; Hehui Wang; Fen Xu; Lixian Sun; Jinfan Wu; Guorong Zhang; Yanling Zhu, Qiwei Shao, Yong Luo; Yijie Wang; Yuan Gao; Yongjin Zou. *Novel MOF/COF dual carrier anchoring Ru nanoparticles for improved hydrogen production by hydrolysis of $NaBH_4$. J. Alloys Compd.* 2024, 978, 173415; A. G. Abd-Elrahim; Doo-Man Chun; E. M. M. Ibrahim; Faisal K. Algethami; Mohamed Nady Goda; Manar A. Ali. *Sonochemical synthesis of mesoporous $Zn_yCd_{1-y}S$ quantum dots: Composition-dependent optical, electrical, dielectric, and hydrogen-generation characteristics. J. Phys. Chem. Solids* 2025, 197, 112414]. However, the rarity of noble metals and the high cost associated significantly hinders the practical utilization of noble metal containing catalyst. Therefore, researchers presently aim to use transition metals for the preparation of catalysts in replacement of noble metals.

Accordingly, it is one object of the present disclosure to provide a simple and efficient method for hydrogen generation that may overcome the drawbacks of the prior art.

SUMMARY

In an exemplary embodiment, a method of hydrogen generation is described. The method may include reacting sodium borohydride with water in the presence of a $Cu_2(OH)_3NO_3/CaSiO_3/g\text{-}C_3N_4$ nanocomposite to hydrolyze the sodium borohydride ($NaBH_4$) and generate hydrogen.

In some embodiments, the hydrogen may be generated with a certain volume rate at a temperature higher than ambient temperature via hydrolyzing the sodium borohydride.

In some embodiments, the hydrogen may be generated with a certain volume rate at an ambient temperature via hydrolyzing the sodium borohydride.

In some embodiments, the hydrogen generated after 5 minutes (min.) when the $NaBH_4$ is reacted with water at an ambient temperature may have a volume several times more in the presence of the $Cu_2(OH)_3NO_3/CaSiO_3/g\text{-}C_3N_4$ nanocomposite than in the absence of the $Cu_2(OH)_3NO_3/CaSiO_3/g\text{-}C_3N_4$ nanocomposite.

In some embodiments, the $Cu_2(OH)_3NO_3/CaSiO_3/g\text{-}C_3N_4$ nanocomposite may include a graphitic carbon nitride ($g\text{-}C_3N_4$), a copper hydroxide nitrate ($Cu_2(OH)_3NO_3$) and a calcium silicate ($CaSiO_3$).

In another exemplary embodiment, a process of making the $Cu_2(OH)_3NO_3/CaSiO_3/g\text{-}C_3N_4$ nanocomposite is described. The process may include mixing the calcium silicate ($CaSiO_3$), the graphitic carbon nitride ($g\text{-}C_3N_4$), and a copper salt in a glycol solvent to form a mixture. The process may include microwaving the mixture to form the $Cu_2(OH)_3NO_3/CaSiO_3/g\text{-}C_3N_4$ nanocomposite.

In some embodiments, forming the $CaSiO_3$ is described. The $CaSiO_3$ may be formed by sonicating a mixture of a calcium salt and a silicate salt in an aqueous alcohol solution to form a calcium silicate mixture, followed by heating the $CaSiO_3$ mixture to an elevated temperature for a sufficient amount of time to form the $CaSiO_3$. The calcium salt may be selected from the group consisting of calcium nitrate, calcium chloride, calcium phosphate, calcium carbonate and calcium citrate. The silicate salt may be selected from the group consisting of calcium silicate, sodium silicate, potassium silicate, zeolites and micas.

In some embodiments, the $g\text{-}C_3N_4$ may be formed by heating urea to an elevated temperature for a sufficient amount of time.

In some embodiments, the mixing may include a copper salt selected from the group consisting of copper nitrate ($Cu(NO_3)_2$), copper chloride ($CuCl_2$), copper sulfate ($CuSO_4$), copper bromide (CuBr) and copper cyanide (CuCN).

In some embodiments, the microwaving may be performed at an elevated temperature under a certain pressure for a sufficient amount of time.

In some embodiments, the $Cu_2(OH)_3NO_3/CaSiO_3/g-C_3N_4$ nanocomposite may include a plurality of metal oxides nanorods and a plurality of $g-C_3N_4$ nanosheets.

In some embodiments, the $Cu_2(OH)_3NO_3/CaSiO_3/g-C_3N_4$ nanocomposite may have the metal oxide nanorods including $Cu_2(OH)_3NO_3$ and $CaSiO_3$.

In some embodiments, the $Cu_2(OH)_3NO_3/CaSiO_3/g-C_3N_4$ nanocomposite may have the metal oxide nanorods of a certain average length at a micrometers scale.

In some embodiments, the $Cu_2(OH)_3NO_3/CaSiO_3/g-C_3N_4$ nanocomposite may have the metal oxide nanorods including nanowires protruding perpendicularly to the rods.

In some embodiments, the $Cu_2(OH)_3NO_3/CaSiO_3/g-C_3N_4$ nanocomposite may have the metal oxide nanorods including nanowires of a certain length at a nanometers scale dispersed on the $g-C_3N_4$ nanosheets with some aggregates of the metal oxide nanorods.

In some embodiments, the $Cu_2(OH)_3NO_3/CaSiO_3/g-C_3N_4$ nanocomposite may have a mesoporous structure with a plurality of wide pores in the $g-C_3N_4$ nanosheets where the metal oxides nanorods deposit.

In some embodiments, the $Cu_2(OH)_3NO_3/CaSiO_3/g-C_3N_4$ nanocomposite may have a certain average pore diameter at a nanometer scale.

In some embodiments, the $Cu_2(OH)_3NO_3/CaSiO_3/g-C_3N_4$ nanocomposite may have a certain Brunauer-Emmett-Teller (BET) surface area.

In some embodiment, the $Cu_2(OH)_3NO_3/CaSiO_3/g-C_3N_4$ nanocomposite may have a certain BET surface area at a narrower range.

In some embodiment, the $Cu_2(OH)_3NO_3/CaSiO_3/g-C_3N_4$ nanocomposite may have a certain average pore volume.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
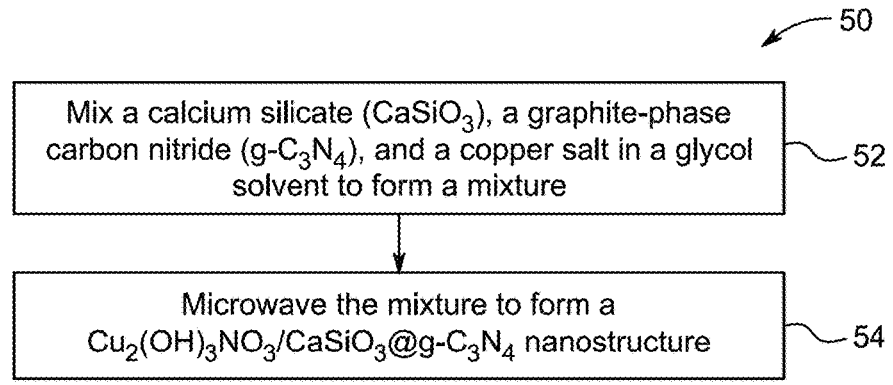
FIG. 1 is a schematic flowchart of a process of preparing the $Cu_2(OH)_2NO_3/CaSiO_3/g-C_3N_4$ nanocomposite, according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'nanoparticles (NPs)' refers to particles having a particle size of 1 nm to 500 nanometers (nm) within the scope of the present invention. The NPs may exist in various morphological shapes, such as nanotubes, nanowires, nanospheres, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, etc., and mixtures thereof.

As used herein, the term 'nanocomposites' refers to a composite material in which at least one dimension of the component is in the nanometer size scale (<100 nm). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material.

As used herein, the term '$g-C_3N_4$ nanosheets' refers to thin, two-dimensional sheets of graphitic carbon nitride ($g-C_3N_4$), a material composed of carbon, nitrogen, and hydrogen atoms arranged in a graphitic-like structure. These nanosheets are typically thick nanometers and possess high surface area and unique electronic properties, making them suitable for various applications, including photocatalysis, energy storage, and sensing. The nanosheets can enhance the material's photocatalytic efficiency by providing more active sites for reactions and improving the separation of charge carriers under visible light irradiation.

In this disclosure, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoints.

The temperature parameters in the present disclosure, if not specifically limited, are both allowed to be constant temperature processing and allowed to be varied within a certain temperature interval. The constant temperature processing allows the temperature to fluctuate within the precision range of the instrument control. It is allowed to fluctuate in the range of, for example, 5 degrees Celsius (° C.), 4° C., 3° C., 2° C. and 1° C.

A weight percent of a component, unless specifically stated to the contrary, is based on the total weight of the formulation or composition in which the component is included. For example, if a particular element or component in a composition or article is said to have 5 weight percent (wt. %), it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopes of naturally occurring nickel $^{28}Ni$ include 58Ni, $^{60}Ni$, $^{61}Ni$, $^{62}Ni$, and $^{64}Ni$. Isotopically labeled compounds of the disclosure may generally be prepared by conventional techniques known to those skilled in the art or by processes analogous to those described herein, using an appropriate isotopically labeled reagent in place of the non-labeled reagent otherwise employed.

As used herein, the term 'hydrogen generation rate (HGR)' is the amount of hydrogen produced per unit time, typically expressed in moles per minute (min) or milliliters per minute. As used herein, the term 'amount' refers to the proportion or presence of a particular substance, component, or element within a larger system. It can be quantified in various ways, such as percentage, concentration, or mass. The content of an element refers to its proportion or concentration within a given material, mixture, or compound. It can be expressed in various units such as atomic percent (at. %), weight percent (wt. %), or mole fraction.

As used herein, the term 'XRD' refers to X-ray diffraction, a scientific technique used to study the structure of materials. It is commonly used to identify the crystalline phases of a substance, crystal structure and to analyze the arrangement of atoms within a material.

As used herein, the term 'BET' refers to the Brunauer-Emmett-Teller method, a widely used technique for determining the surface area and porosity of materials. It is based on the adsorption of nitrogen gas onto the surface of the material and is commonly employed to calculate specific surface area, pore volume, and pore size distribution.

As used herein, the term 'surface area' refers to the total area of the surface of a material that is available for interaction with its environment. It is a measure of the extent of a material's surface exposed to external conditions, which can be crucial in determining the material's reactivity, adsorption capacity, or other surface-related properties.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a key parameter in characterizing the texture and permeability of porous materials, influencing their adsorption, filtration, or catalytic properties.

As used herein, the term 'pore volume' refers to the total volume of void spaces (pores) within a material that is capable of being filled by a gas or liquid. It is typically expressed in cubic centimeters per gram ($cm^3/g$) and is an important parameter in characterizing the porous structure of materials, such as adsorbents or catalysts.

As used herein the term 'Barrett-Joyner-Halenda (BJH)' method is a method used to analyze pore size distribution in porous materials, typically from nitrogen adsorption-desorption isotherms. The BJH method is especially useful for characterizing mesoporous materials (with pore sizes between 2 and 50 nm).

As used herein, the term 'mesoporous' refers to a type of material that contains pores (voids or spaces) with diameters typically ranging from 2 to 50 nm. These pores are intermediate in size between micropores (less than 2 nm) and macropores (greater than 50 nm).

As used herein, the term 'transmission electron microscopy (TEM)' refers to a microscopy technique that utilizes a beam of electrons transmitted through a thin sample to form an image. TEM provides high-resolution imaging at the nanometer or even atomic scale, allowing the observation of the internal structure of materials. This method is widely used to examine the morphology, crystallography, and composition of nanoparticles, materials, and biological specimens, offering detailed insights into their microstructure.

As used herein, the term 'zeolites' refer to materials having the crystalline structure or three-dimensional framework of, but not necessarily the elemental composition of, a zeolite. Zeolites are porous silicate or aluminosilicate minerals that occur in nature. Elementary building units of zeolites are $SiO_4$ (and if appropriate, $AlO_4$) tetrahedra. Adjacent tetrahedra are linked at their corners via a common oxygen atom, which results in an inorganic macromolecule with a three-dimensional framework (frequently referred to as the zeolite framework). The three-dimensional framework of a zeolite also includes channels, channel intersections, and/or cages having dimensions in the range of 0.1-10 nanometers (nm), preferably 0.2-5 nm, more preferably 0.2-2 nm. Water molecules may be present inside these channels, channel intersections, and/or cages. Zeolites that are devoid of aluminum may be referred to as 'all-silica zeolites' or 'aluminum-free zeolites.' Some zeolites that are substantially free of, but not devoid of, aluminum are called 'high-silica zeolites.' Sometimes, the term 'zeolite' is used to refer exclusively to aluminosilicate materials, excluding aluminum-free zeolites or all-silica zeolites.

In some embodiments, the zeolitic material has a three-dimensional framework that is at least one zeolite framework selected from the group consisting of a 4-membered ring zeolite framework, a 6-membered ring zeolite framework, a 10-membered ring zeolite framework, and a 12-membered ring zeolite framework. The zeolite may have a natrolite framework (e.g. gonnardite, natrolite, mesolite, paranatrolite, scolecite, and tetranatrolite), edingtonite framework (e.g. edingtonite and kalborsite), thomsonite framework, analcime framework (e.g. analcime, leucite, pollucite, and wairakite), phillipsite framework (e.g. harmotome), gismondine framework (e.g. amicite, gismondine, garronite, and gobbinsite), chabazite framework (e.g. chabazite-series, herschelite, willhendersonite, and SSZ-13), faujasite framework (e.g. faujasite-series, Linde type X, and Linde type Y), mordenite framework (e.g. maricopaite and mordenite), heulandite framework (e.g. clinoptilolite and heulandite-series), stilbite framework (e.g. barrerite, stellerite, and stilbite-series), brewsterite framework, or cowlesite framework. In some embodiments, the porous silicate and/or aluminosilicate matrix is a zeolitic material having a zeolite framework selected from the group consisting of ZSM-5, ZSM-8, ZSM-11, ZSM-12, ZSM-18, ZSM-23, ZSM-35, and ZSM-39.

Aspect of present disclosure is directed to a method of hydrogen generation, including reaction of sodium borohydride ($NaBH_4$) with water in the presence of a nanocomposite and more particularly a copper hydroxy nitrate ($Cu_2(OH)_2NO_3$), a calcium silicate ($CaSiO_3$) and a graphite-phase carbon nitride ($g$-$C_3N_4$) based nanocomposite to hydrolyze the $NaBH_4$ and generate hydrogen. The use of the nanocomposite demonstrated excellent catalytic performance for the hydrolysis of $NaBH_4$, resulting in the generation of clean hydrogen rapidly and efficiently under green conditions. This method, with a high HGR highlights its strong potential for energy storage and environmental applications.

In some embodiments, the nanocomposite includes the $g$-$C_3N_4$ in an amount of 20-40 percent by weight (wt. %), preferably 21-39 wt. %, preferably 22-38 wt. %, preferably 23-37 wt. %, preferably 24-36 wt. %, preferably 25-35 wt. % and preferably 26-34 wt. %, a $Cu_2(OH)_3NO_3$ in an amount of 20-40 wt. %, preferably 21-39 wt. %, preferably 22-38 wt. %, preferably 23-37 wt. %, preferably 24-36 wt. %, preferably 25-35 wt. %, preferably 26-34 wt. % and a $CaSiO_3$ in an amount of 20-40 wt. %, preferably 21-39 wt. %, preferably 22-38 wt. %, preferably 23-37 wt. %, preferably 24-36 wt. %, preferably 25-35 wt. %, preferably 26-34 wt. %, based on a total weight of the nanocomposite catalyst. In a preferred embodiment, the $g$-$C_3N_4$, $Cu_2(OH)_3NO_3$ and $CaSiO_3$ present in the nanocomposite is 33.33 wt. %.

In some embodiments, metal oxides and the $g$-$C_3N_4$ present in the nanocomposite may be in form of nanorods, nanotubes, nanowires, nanocubes, nanosheets, nanoplates and nanoflowers. In a preferred embodiment, the nanocomposite includes a plurality of metal oxides nanorods and a plurality of $g$-$C_3N_4$ nanosheets where the nanocomposite has the metal oxide nanorods including $Cu_2(OH)_3NO_3$ and $CaSiO_3$.

In some embodiments, the nanocomposite has the metal oxide nanorods including nanowires protruding perpendicularly to the rods. In some embodiments, the nanocomposite has the metal oxide nanorods including nanowires of a length 10-50 nm, preferably 11-49 nm, preferably 12-48 nm, preferably 14-46 nm, preferably 16-44 nm, preferably 18-42 nm, preferably 20-40 nm, preferably 22-38 nm, preferably 24-36 nm, preferably 26-34 nm, preferably 28-32 nm, preferably 29-30 nm dispersed on the $g$-$C_3N_4$ nanosheets with some aggregates of the metal oxide nanorods.

In some embodiments, the nanocomposite has the metal oxide nanorods of an average length 1-3 micrometer (μm), preferably 1.1-2.9 μm, preferably 1.2-2.8 μm, preferably 1.3-2.7 μm, preferably 1.4-2.6 μm, preferably 1.5-2.5 μm, preferably 1.6-2.4 μm, preferably 1.7-2.3 μm, preferably 1.8-2.2 μm, preferably 1.9-2.1 μm, preferably 1.91-2.0 μm, preferably 1.92-1.99 μm, preferably 1.93-1.98 μm. In a preferred embodiment, the average length of metal oxide nanorods in the heterostructure is 1.97 μm.

In some embodiments, the nanocomposite is porous. A porous material is the one that forms a porous bulk solid. Pores may be micropores, mesopores, macropores, and/or a combination thereof. The pores exist in the bulk material, not necessarily in the molecular structure of the material. The term 'microporous' means that nanocomposite have pores with an average pore width (i.e. diameter) of less than 2 nm. The term 'mesoporous' means the pores of the nanocomposite have an average pore width of 2-50 nm. The term 'microporous' means the pores of nanocomposite have an average pore width larger than 50 nm. Pore size may be determined by methods including, but not limited to, gas adsorption (e.g. $N_2$ adsorption), mercury intrusion porosimetry, and imaging techniques such as scanning electron microscopy (SEM), and X-ray computed tomography (XRCT). In a preferred embodiment, the nanocomposite has a mesoporous structure with a plurality of wide pores in the $g$-$C_3N_4$ nanosheets where the metal oxides nanorods deposit.

In some embodiments, the nanocomposite has a BET surface area of 100-200 square meters per gram ($m^2g^{-1}$), preferably 104-198 $m^2g^{-1}$, preferably 106-196 $m^2g^{-1}$, preferably 108-194 $m^2g^{-1}$, preferably 110-192 $m^2g^{-1}$, preferably 112-190 $m^2g^{-1}$, preferably 114-185 $m^2g^{-1}$, preferably 116-180 $m^2g^{-1}$, preferably 118-175 $m^2g^{-1}$, preferably 120-170 $m^2g^{-1}$, preferably 122-165 $m^2g^{-1}$, preferably 124-160 $m^2g^{-1}$, preferably 126-155 $m^2g^{-1}$, preferably 128-154 $m^2g^{-1}$, preferably 130-153 $m^2g^{-1}$, preferably 135-152 $m^2g^{-1}$ and preferably 140-150 $m^2g^{-1}$.

In some embodiments, the nanocomposite has the BET surface area of 140-160 $m^2g^{-1}$, preferably 141-159 $m^2g^{-1}$, preferably 141.2-158.9 $m^2g^{-1}$, preferably 141.4-158.7 $m^2g^{-1}$, preferably 141.6-158.5 $m^2g^{-1}$, preferably 141.8-158.2 $m^2g^{-1}$, preferably 142-158 $m^2g^{-1}$, preferably 142.2-157.9 $m^2g^{-1}$, preferably 142.4-157.7 $m^2g^{-1}$, preferably 142.6-157.5 $m^2g^{-1}$, preferably 142.8-157.3 $m^2g^{-1}$, preferably 143-157 $m^2g^{-1}$, preferably 143.2-156.8 $m^2g^{-1}$, preferably 143.4-156.4 $m^2g^{-1}$, preferably 143.6-156.2 $m^2g^{-1}$, preferably 143.8-156 $m^2g^{-1}$, preferably 144-155.8 $m^2g^{-1}$, preferably 144.4-155.4 $m^2g^{-1}$, preferably 144.8-155 $m^2g^{-1}$, preferably 145-154.8 $m^2g^{-1}$, preferably 145.4-154.4 $m^2g^{-1}$, preferably 145.8-154 $m^2g^{-1}$, preferably 146-153.8 $m^2g^{-1}$, preferably 146.4-153.4 $m^2g^{-1}$, preferably 146.8-153 $m^2g^{-1}$, preferably 147-152.8 $m^2g^{-1}$, preferably 147.4-152.4 $m^2g^{-1}$, preferably 147.8-152 $m^2g^{-1}$, preferably 148-151.8 $m^2g^{-1}$, preferably 148.4-151.4 $m^2g^{-1}$ and preferably 149.8-151 $m^2g^{-1}$. In a preferred embodiment, the surface area of the nanocomposite is 149.9 $m^2g^{-1}$.

The BET hypothesis is the foundation for a significant analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. In some embodiments, pore diameter, pore volume, and BET surface area are measured by gas adsorption analysis, preferably $N_2$ adsorption analysis (e.g., $N_2$ adsorption isotherms).

In some embodiments, the average pore distribution of the nanocomposite may include, but is not limited to, crystalline average pore distribution, bimodal, trimodal, multimodal, narrow, broad, and Gaussian. In a preferred embodiment, the average pore distribution of nanocomposite is unimodal, indicating a single dominant pore size within the material. This unimodal distribution suggests that the nanocomposites possess a relatively narrow pore size range, resulting in more uniform pore structures and enhancing specific properties such as adsorption capacity, catalytic activity, or surface reactivity.

In some embodiments, the nanocomposite has an average pore diameter of 3-7 nm, preferably 3.1-6.9 nm, preferably 3.2-6.8 nm, preferably 3.3-6.7 nm, preferably 3.4-6.6 nm, preferably 3.5-6.5 nm, preferably 3.6-6.4 nm, preferably 3.7-6.3 nm, preferably 3.8-6.2 nm, preferably 3.9-6.1 nm, preferably 4.0-6.0 nm, preferably 4.1-5.9 nm, preferably 4.2-5.8 nm, preferably 4.3-5.7 nm, preferably 4.4-5.6 nm, preferably 4.5-5.4 nm, preferably 4.6-5.3 nm, preferably 4.7-5.2 nm and preferably 4.8-5.1 nm. In a preferred embodiment, the average pore diameter of the nanocomposite is 5 nm.

In some embodiments, the nanocomposite has an average pore volume of 0.3 to 0.4 cubic centimeters per gram ($cm^3g^{-1}$), preferably 0.31-0.39 $cm^3g^{-1}$, preferably 0.32-0.38 $cm^3g^{-1}$, preferably 0.33-0.37 $cm^3g^{-1}$, preferably 0.34-0.36 $cm^3g^{-1}$. In a preferred embodiment, the average pore volume of the nanocomposite is 0.354 $cm^3g^{-1}$.

In another aspect a method of hydrogen production is described that includes reacting a borohydride with water in the presence of the nanocomposite to hydrolyze the borohydride and generate hydrogen. In some embodiments, the water may be tap water, distilled water, bi-distilled water, deionized water, deionized distilled water, reverse osmosis water, hard water, fresh water, brine/salt water, the hard water, and the freshwater may include salts of sodium, magnesium, calcium, potassium, ammonium, and iron, and anions such as chloride, bicarbonate, carbonate, sulfate, sulfite, phosphate, iodide, nitrate, acetate, citrate, fluoride, and nitrite.

In some embodiments, borohydride salts may include but is not limited to lithium borohydride, potassium borohydride, calcium borohydride, magnesium borohydride, aluminum borohydride, zinc borohydride, barium borohydride, cesium borohydride, rubidium borohydride, strontium borohydride, tetrabutylammonium borohydride, ammonium borohydride, trimethylammonium borohydride, benzyltrimethylammonium borohydride, potassium tetraphenylborate, lithium tetrafluoroborate, potassium tetrafluoroborate, sodium tetrafluoroborate, copper borohydride, nickel borohydride, iron borohydride, lead borohydride, copper (II) borohydride, thallium borohydride, gold borohydride, silver borohydride, rhodium borohydride, palladium borohydride, antimony borohydride, and/or combinations thereof may also be used. In a preferred embodiment, the borohydride used is $NaBH_4$.

In some embodiments, the hydrogen is generated with a volume rate from 250-300 milliliters per minute (mL/min), preferably 252-298 mL/min, preferably 254-297 mL/min, preferably 256-296 mL/min, preferably 258-295 mL/min, preferably 260-294 mL/min, preferably 262-293 mL/min, preferably 264-292 mL/min, preferably 266-291 mL/min, preferably 268-290 mL/min, preferably 270-289 mL/min, preferably 272-288 mL/min, preferably 274-287 mL/min, at a temperature of 25-30° C. and preferably 26-29° C. via hydrolyzing the $NaBH_4$ with a mass of 0.5-1 gram (g). In a preferred embodiment, 275 milliliters per minute per gram ($mLmin^{-1}g^{-1}$) of hydrogen is generated at reaction temperature of 28° C.

In some embodiments, the hydrogen is generated with a volume rate from 2400-2600 mL/min, preferably 2405-2595 mL/min, preferably 2410-2590 mL/min, preferably 2415-2585 mL/min, preferably 2420-2580 mL/min, preferably 2425-2565 mL/min, preferably 2430-2560 mL/min, preferably 2435-2545 ml/min, preferably 2440-2540 mL/min, preferably 2445-2535 mL/min, preferably 2450-2530 ml/min, preferably 2455-2525 mL/min, preferably 2460-2520 mL/min, preferably 2465-2515 mL/min, preferably 2470-2510 mL/min, preferably 2475-2505 mL/min and preferably 2480-2500 mL/min, at a temperature of 35-40° C. and preferably 36-39° C. via hydrolyzing the $NaBH_4$ with a mass of 0.5-1 g. In a preferred embodiment, the 2500 $mLmin^{-1}g^{-1}$ of hydrogen is generated at reaction temperature of 38° C.

In some embodiments, the hydrogen generated via hydrolysis of sodium borohydride may have different rates of hydrogen generation in presence and absence of the nanocomposite. In a preferred embodiment, the hydrogen generated after 5 min when the sodium borohydride is reacted with water at a temperature of 25-30° C. has a volume 5-10 times more in the presence of the nanocomposite than in the absence of the nanocomposite. As the hydrogen generated at 5 min in the presence of the nanocomposite is almost 8 times without the nanocomposite.

FIG. 1 illustrates a schematic flow chart of a process 50 of preparing the $Cu_2(OH)_3NO_3/CaSiO_3@g\text{-}C_3N_4$ nanocomposite. The order in which the process 50 is described is not intended to be construed as a limitation, and any number of the method steps described can be combined to implement the process 50. Additionally, individual steps may be removed or skipped from the process 50 without departing from the spirit and scope of the present disclosure.

At step 52, the process 50 includes mixing a $CaSiO_3$, a graphite-phase carbon nitride (g-$C_3N_4$), and a copper salt in a glycol solvent to form a mixture. In some embodiments, the mixing may be done by stirring, swirling, sonicating, or a combination thereof.

In some embodiments, the calcium silicate is formed by sonicating a mixture of a calcium salt and a silicate salt in an aqueous alcohol solution to form a calcium silicate mixture, and heating the calcium silicate mixture to a temperature of 160-200° C. for 1 to 3 hours (h) to form the $CaSiO_3$. In some embodiments, calcium salt may include but is not limited to calcium chloride, calcium sulfate, calcium carbonate, calcium phosphate, calcium acetate, calcium citrate, calcium lactate, calcium gluconate, calcium formate, calcium oxalate, calcium tartrate, calcium ascorbate, calcium benzoate, calcium propionate, calcium stearate, calcium hydroxide, calcium peroxide, calcium iodate, calcium molybdate, calcium hypochlorite, calcium thiocyanate, calcium chromate, calcium ferrite, calcium bromide, calcium fluoride, calcium sulfide, calcium arsenate, calcium tungstate, calcium borate, calcium perchlorate, and calcium hydride. In some embodiments, the calcium salt is selected from calcium nitrate, calcium chloride, calcium phosphate, calcium carbonate, and calcium citrate. In a preferred embodiment, the calcium salt is calcium nitrate.

In some embodiments, the silicate salt is at least one selected from potassium silicate, lithium silicate, rubidium silicate, cesium silicate, sodium orthosilicate, potassium orthosilicate, lithium orthosilicate, rubidium orthosilicate, cesium orthosilicate, sodium disilicate, potassium disilicate, lithium disilicate, rubidium disilicate, cesium disilicate, sodium trisilicate, potassium trisilicate, lithium trisilicate, rubidium trisilicate, cesium trisilicate, sodium tetrasilicate, potassium tetrasilicate, lithium tetrasilicate, rubidium tetrasilicate, cesium tetrasilicate, sodium hexasilicate, potassium hexasilicate, lithium hexasilicate, rubidium hexasilicate, and cesium hexasilicate. In some embodiments, the silicate salt is selected from the group consisting of calcium silicate, sodium silicate, potassium silicate, zeolites, and micas. In a preferred embodiment, the silicate salt is sodium metasilicate.

In some embodiments, the aqueous alcohol solution may include at least one alcohol selected from methanol, propanol, isopropanol, butanol, isobutanol, sec-butanol, tert-butanol, 1-propanol, 2-propanol, 1-butanol, 2-butanol, methylpropanol, dimethylpropanol, ethylpropanol, cyclopropanol, fluoromethanol, chloromethanol, bromomethanol, and iodomethanol. In a preferred embodiment, equal moles of calcium nitrate and sodium metasilicate were dispersed in 100 ml of ethanol:water (1:1). Water may be tap water, distilled water, double-distilled water, deionized water, deionized distilled water, reverse osmosis water, and/or some other water.

In some embodiments, the calcium silicate mixture can be heated using heating appliances such as ovens, microwaves, autoclaves, hot plates, heating mantles and tapes, oil baths, salt baths, sand baths, air baths, hot-tube furnaces, and hot-air guns.

In some embodiments, the calcium silicate mixture is heated at a temperature of from 160-200° C., preferably 161-198° C., preferably 162-197° C., preferably 163-196° C., preferably 164-195° C., preferably 165-194° C., preferably 166-193° C., preferably 167-192° C., preferably 168-191° C., preferably 169-190° C., preferably 170-189° C., preferably 171-187° C., preferably 172-188° C., preferably 173-187° C., preferably 174-186° C., preferably 175-185° C., preferably 176-184° C., preferably 177-183° C., preferably 178-182° C., preferably 179-181° C., for 1-3 h, preferably 1.1-2.9 h, preferably 1.2-2.8 h, preferably 1.3-2.7 h, preferably 1.4-2.6 h, preferably 1.5-2.5 h, preferably 1.6-2.4 h, preferably 1.7-2.3 h, preferably 1.8-2.2 h, preferably 1.9-2.1 h to form the $CaSiO_3$. In a preferred embodiment, the mixture is transferred in an autoclave and heated at 180° C. for 2 h in an oven.

In some embodiments, the $g-C_3N_4$ is formed by heating urea to a temperature of 550-650° C., preferably 555-645° C., preferably 560-640° C., preferably 565-635° C., preferably 570-630° C., preferably 575-625° C., preferably 580-620° C., preferably 585-615° C., preferably 590-610° C., preferably 595-605° C. for 30-60 min, preferably 31-59 min, preferably 32-58 min, preferably 33-57 min, preferably 34-56 min, preferably 35-55 min, preferably 36-54 min, preferably 37-53 min, preferably 38-52 min, preferably 39-51 min, preferably 40-50 min, preferably 41-49 min, preferably 42-48 min, preferably 43-47 min, preferably 44-46 min. In a preferred embodiment, the urea is heated at 600° C. for 45 min.

In an alternate embodiment, other nitrogen-containing precursors, to urea, such as melamine, dicyandiamide, ammonium thiocyanate, or ammonium carbonate, may also be used. These alternatives provide nitrogen necessary for the formation of carbon nitride structures. Typically, these precursors are used in amounts of approximately 5 wt. % relative to the total weight of the nanocomposite to achieve the desired nitrogen content for the desired structural properties.

In some embodiments, the copper salt may include, but is not limited to, copper sulfate, copper acetate, copper carbonate, copper chloride, copper bromide, copper iodide, copper cyanide, copper fluoride, copper thiocyanate, copper oxalate, copper tartrate, copper formate, copper citrate, copper propionate, copper benzoate, copper phosphate, copper chromate, copper arsenate, copper molybdate, copper tungstate, copper selenate, copper tellurate, copper silicate, copper hydroxide, copper perchlorate, copper chlorate, copper bromate, copper iodate, copper sulfate pentahydrate, and copper nitrate. In some embodiments, the copper salt is selected from the group consisting of copper nitrate, copper chloride, copper sulfate, copper bromide, and copper cyanide.

In some embodiments, the $Cu_2(OH)_3NO_3/CaSiO_3@g-C_3N_4$ nanocomposite includes the $Cu_2(OH)_3NO_3$, the $CaSiO_3$, and the $g-C_3N_4$ in a mass ratio of 0.5-1.5:0.5-1.5: 0.5-1.5, preferably 0.6-1.4:0.6-1.4:0.6-1.4, preferably 0.7-1.3:0.7-1.3:0.7-1.3, and preferably 0.8-1.2:0.8-1.2:0.8-1.2, preferably 0.9-1.1:0.9-1.1:0.9-1.1 in a preferred embodiment, the mass ratio of $Cu_2(OH)_3NO_3$, $CaSiO_3$, and $g-C_3N_4$ is 1:1:1.

At step 54, the process 50 includes microwaving the mixture to form the $Cu_2(OH)_3NO_3/CaSiO_3@g-C_3N_4$ nanocomposite. In some embodiments, the mixture is microwaved at a temperature of 160-200° C., preferably 161-199° C., preferably 163-197° C., preferably 165-195° C., preferably 167-193° C., preferably 169-191° C., preferably 171-189° C., preferably 173-187° C., preferably 175-185° C., preferably 177-183° C., preferably 178-182° C., preferably 179-181° C., at a pressure of 4 to 6 bar, preferably 4.1-5.9 bar, preferably 4.2-5.8 bar, preferably 4.3-5.7 bar, preferably 4.4-5.6 bar, preferably 4.5-5.5 bar, preferably 4.6-5.4 bar, preferably 4.7-5.3 bar, preferably 4.8-5.2 bar, preferably 4.9-5.1 bar, for 30-90 min, preferably 31-89 min, preferably 33-87 min, preferably 36-85 min, preferably 39-83 min, preferably 41-81 min, preferably 43-79 min, preferably 46-77 min, preferably 49-75 min, preferably 52-73 min, preferably 55-70 min, preferably 57-68 min, preferably 59-65 min. In a preferred embodiment, the mixture is microwaved at 180° C. and 5.0 bar pressure for 60 min to form the nanocomposite.

EXAMPLES

The following examples demonstrate hydrogen gas generation using copper hydroxide nitrate $Cu_2(OH)_3NO_3$/calcium silicate $(CaSiO_3)$/graphitic carbon nitride $(g-C_3N_4)$ nanocomposite. The examples are provided solely for illustration and are not to be construed as limitations of the present disclosure, as many variations thereof are possible without departing from the spirit and scope of the present disclosure.

Example 1: Fabricating $Cu_2(OH)_2NO_3/CaSiO_3/g-C_3N_4$

According to the present disclosure, equal moles of calcium nitrate $(Ca(NO_3)_2)$ and sodium metasilicate $(Ca_2O_4Si)$ were dispersed in 100 milliliters (ml) of ethanol:water (1:1) in a 150 mL glass beaker and sonicated for 15 minutes (min). The mixture was transferred to a 200 mL autoclave and then placed in an oven operated at 180 degrees Celsius (° C.) for 2.0 hours (h). The product was dispersed in 500 ml distilled water with an ultrasonic bath for 10 min, filtered via a Buchner system, rinsed with distilled water, and dried at 120° C. for 1.0 h. About 30.0 grams (g) of urea was placed in a 100 mL porcelain crucible and closed by its porcelain cover. The hall crucible and cover were raped with three layers of aluminum foil to reduce the urea loss of evaporation. The crucible was heated via a furnace set at 600° C. for 1.0 h. 2.0 g of calcium silicate $(CaSiO_3)$, 2.0 g of graphitic carbon nitride $(g-C_3N_4)$ and the amount of copper (II) nitrate hexahydrate $(Cu(NO_3)_2·6H_2O)$ enough to produce 2.0 g of copper hydroxide nitrate $(Cu_2(OH)_2NO_3)$ were transferred to a mono wave-200 vial (G30), dispersed in 20 mL ethylene glycol monomethyl ether via an ultrasonic bath for 30 minutes. The vial was closed with its Teflon cover and placed in the Anton-Baar Monowave-200 operated at 180° C. and 5.0 bar pressure for 1 h. The product was dispersed in 1 liter (L) distilled water with an ultrasonic bath for 30 min, filtered via a Buchner system, rinsed with distilled water, and dried at 150° C. for 2.0 h.

Figure 2:
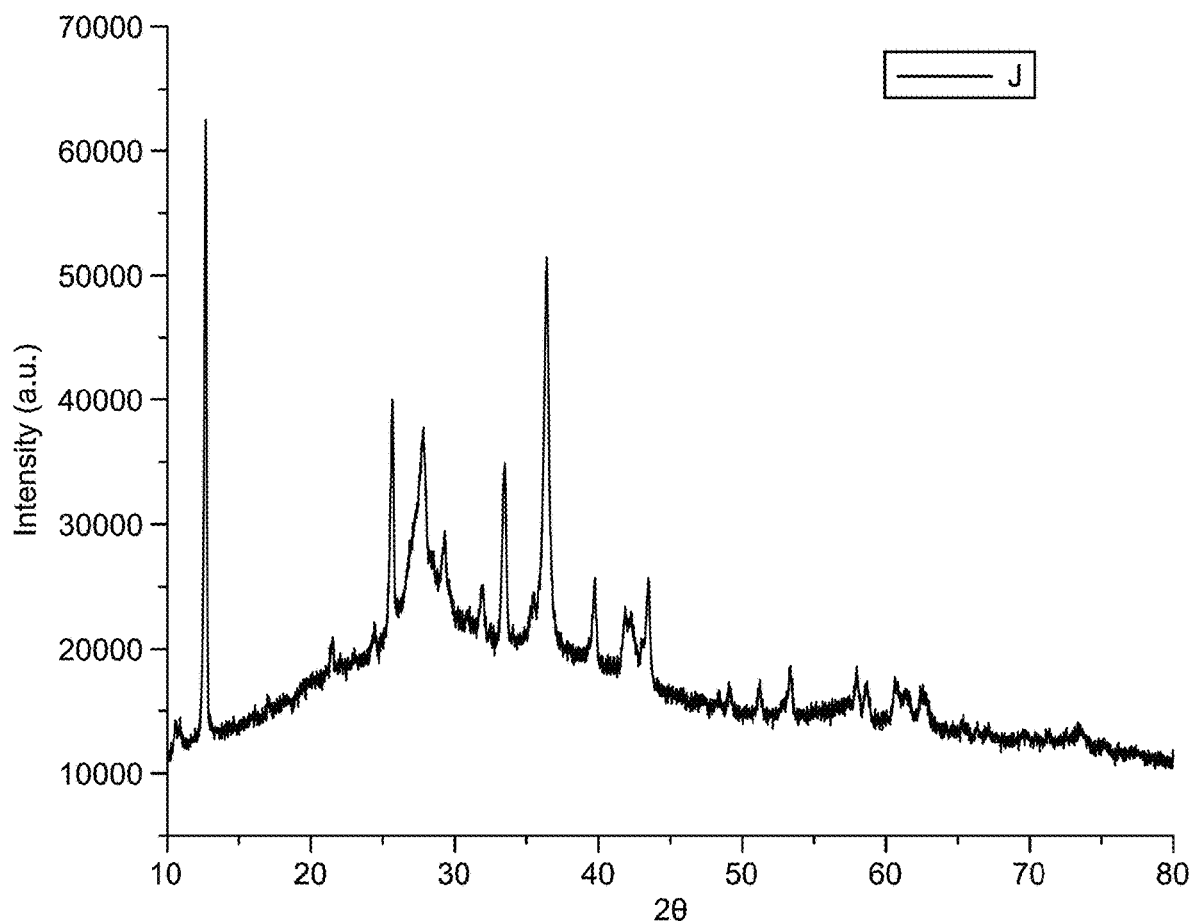
FIG. 2 shows a graph depicting an X-ray diffraction (XRD) pattern of the $Cu_2(OH)_2NO_3/CaSiO_3/g-C_3N_4$ nanocomposite, according to certain embodiments.

As mentioned above, X ray diffraction (XRD) was employed to examine the crystallinity and phases identification in the $Cu_2(OH)_2NO_3/CaSiO_3/g\text{-}C_3N_4$ catalyst, and the results are shown in FIG. 2. The intense peaks and high intensity values indicate that the powder is highly crystalline in nature. In addition, the peak broadening indicates the small particle size of the prepared composites. Examination of the diffraction patterns with the standard joint committee on powder diffraction standards (JCPDS) cards reveals the presence of metallic nanosheet of $Cu_2(OH)_2NO_3$ as a major phase together with minor phases of copper (I) oxide ($Cu_2O$), $CaSiO_3$, and $g\text{-}C_3N_4$. The $Cu_2(OH)_2NO_3$ phase was indexed to the strong reflections at 2θ values of 12.9°, 25.7°, 33.8°, 36.7°, and 43.4° (JCPDS No. 00-003-0061). The $CaSiO_3$ monoclinic phase (JCPDS No. 00-001-0720) was detected at 2θ values of 27.3°, 32.3° and 62.6°. The $Cu_2O$ was characterized by a strong reflection at 2θ value of 36.4° (JCPDS No. 01-078-2076). The diffractions related to $g\text{-}C_3N_4$ were observed at 33.2°, and 58.0° (crystallography open database (COD) No. 1534042 and JCPDS No. 00-050-0848). The weak diffractions of both $CaSiO_3$ and $g\text{-}C_3N_4$ may be attributed to the semi-crystalline nature of these phases and the high crystallinity of $Cu_2O$ and $Cu_2(OH)_2NO_3$ phases in the prepared composite. No other phases were detected indicating the successful fabrication of $Cu_2(OH)_2NO_3/Cu_2O/CaSiO_3/g\text{-}C_3N_4$.

Figure 3A:
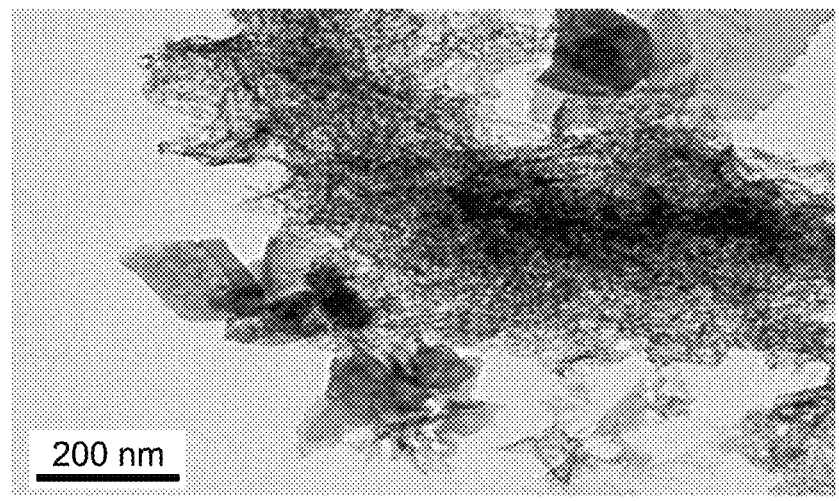
FIG. 3A shows a transmission electron microscopy (TEM) image of the $Cu_2(OH)_2NO_3/CaSiO_3/g-C_3N_4$ nanocomposite at a 200 nanometers (nm) scale, according to certain embodiments.
Figure 3B:
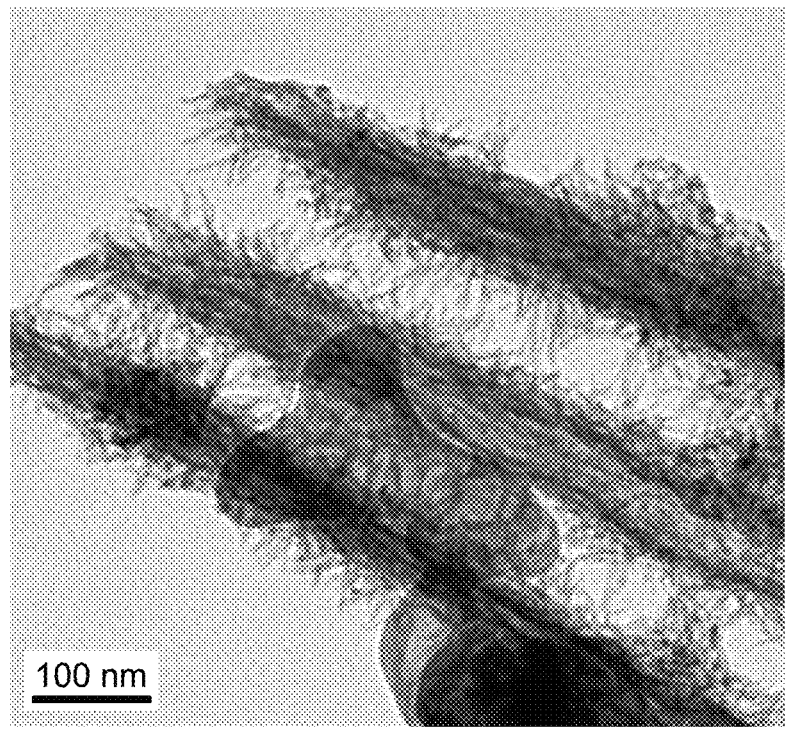
FIG. 3B shows a TEM image of the $Cu_2(OH)_2NO_3/CaSiO_3/g-C_3N_4$ nanocomposite at a 100 nm scale, according to certain embodiments.
Figure 3C:
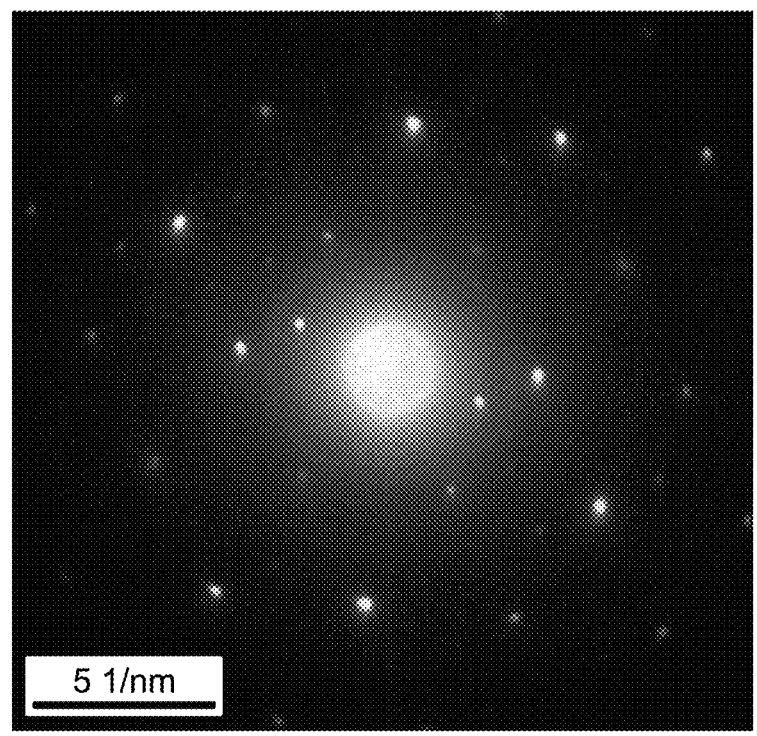
FIG. 3C shows a selected area electron diffraction (SAED) pattern of the $Cu_2(OH)_2NO_3/CaSiO_3/g-C_3N_4$ nanocomposite, according to certain embodiments.

Further, transmission electron microscopy (TEM) images of the $Cu_2(OH)_2NO_3/CaSiO_3@g\text{-}C_3N_4$ nanocomposite were presented in FIG. 3A-3B. The TEM images showed that two-dimensional porous structure constructed with curled and wrinkled nanosheets and platelets of the $g\text{-}C_3N_4$. The image shows also well dispersion of rods metal oxides nanoparticles with size 1.97 micrometers (μm) and some aggregates on nanosheets of $g\text{-}C_3N_4$. The corresponding selected area electron diffraction (SAED) pattern reveals diffraction spots with interplanar spacing of 0.365 nm, 0.242 nm, 0.141 nm, and 0.124 nm due to ($CaSiO_3$: 2-12, $Cu_2(NO_3)(OH)_3$:-111), ($CaSiO_3$:-2-12, $Cu_2(NO_3)(OH)_3$:-211), ($CaSiO_3$: 322, $Cu_2(NO_3)(OH)_3$:00-5), and ($CaSiO_3$:-125) diffraction planes, shown in FIG. 3C.

Figure 4A:
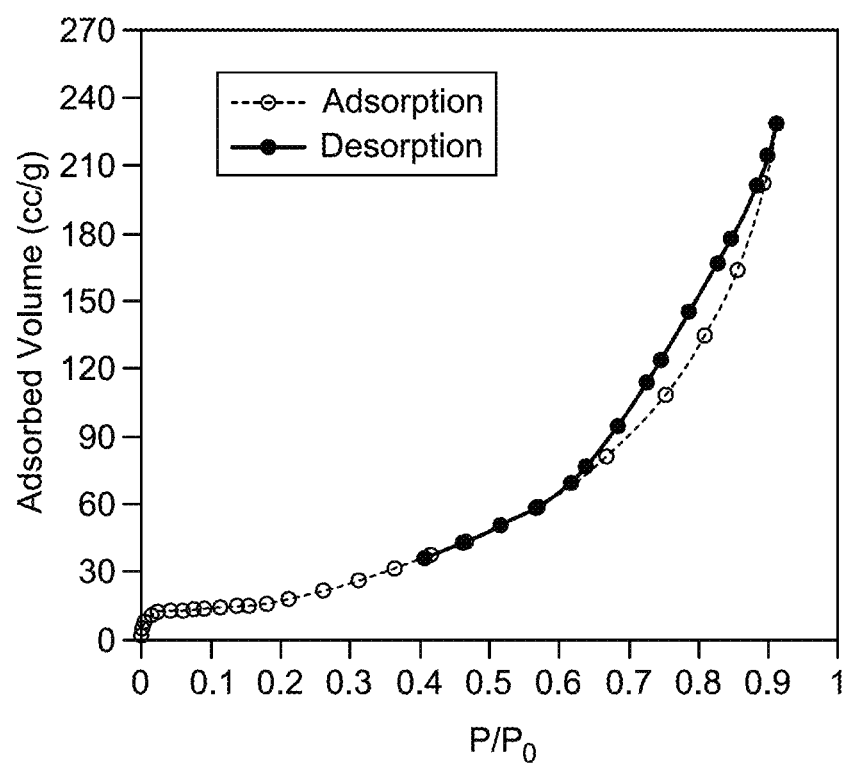
FIG. 4A shows a graph depicting an adsorption-desorption isotherm of the $Cu_2(OH)_2NO_3/CaSiO_3/g-C_3N_4$ nanocomposite, according to certain embodiments.
Figure 4B:
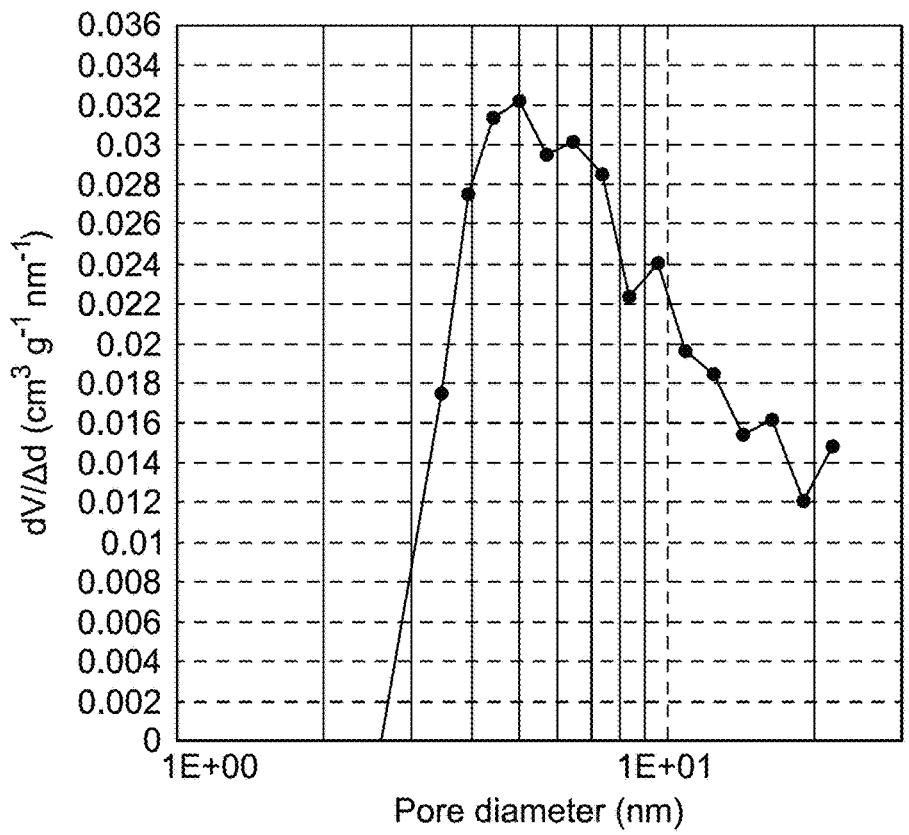
FIG. 4B shows a graph depicting a pore size distribution of the $Cu_2(OH)_2NO_3/CaSiO_3/g-C_3N_4$ nanocomposite, according to certain embodiments.

According to the present disclosure, FIG. 4A shows the adsorption-desorption isotherms of $Cu_2(OH)_2NO_3/CaSiO_3/g\text{-}C_3N_4$ nanocomposite. FIG. 4B shows a graph depicting the pore size distribution of $Cu_2(OH)_2NO_3/CaSiO_3/g\text{-}C_3N_4$ nanocomposite. The nitrogen sorption isotherm of the composite is belonging to type IV with noticed hysteresis loop, indicating the formation of mesoporous structures. However, shifting the loop to a relatively higher pressure ($P/P_0$=0.62-1) suggests the presence of wide mesopores, which may result from the deposition of metal oxides particles in the wide pores of $g\text{-}C_3N_4$. Furthermore, the Brunauer-Emmett-Teller (BET) surface area of the $Cu_2(OH)_2NO_3/CaSiO_3/g\text{-}C_3N_4$ sample was calculated to be 149.9 square meters per gram ($m^2g^{-1}$). The marked high specific surface area reflects the efficient dispersion of these metal oxides nanoparticles on $g\text{-}C_3N_4$ and $CaSiO_3$. Moreover, the pore size distribution curves, plotted using the Barrett-Joyner-Halenda (BJH) method, for the $Cu_2(OH)_2NO_3/CaSiO_3/g\text{-}C_3N_4$ sample exhibited unimodal distribution with average pore diameter maximized at 5 nm and pore volume of 0.354 cubic centimeters per gram ($cm^3g^{-1}$). All the isotherms belong to the category $H_3$ type of pores, which do not exhibit limiting adsorption at high $P/P_o$ and arise due to aggregation of plate-like particles giving rise to slit-shaped pores. This indicates that the assembly of $Cu_2(OH)_2NO_3/CaSiO_3/g\text{-}C_3N_4$ composite provoked a mesoporous array.

Figure 5:
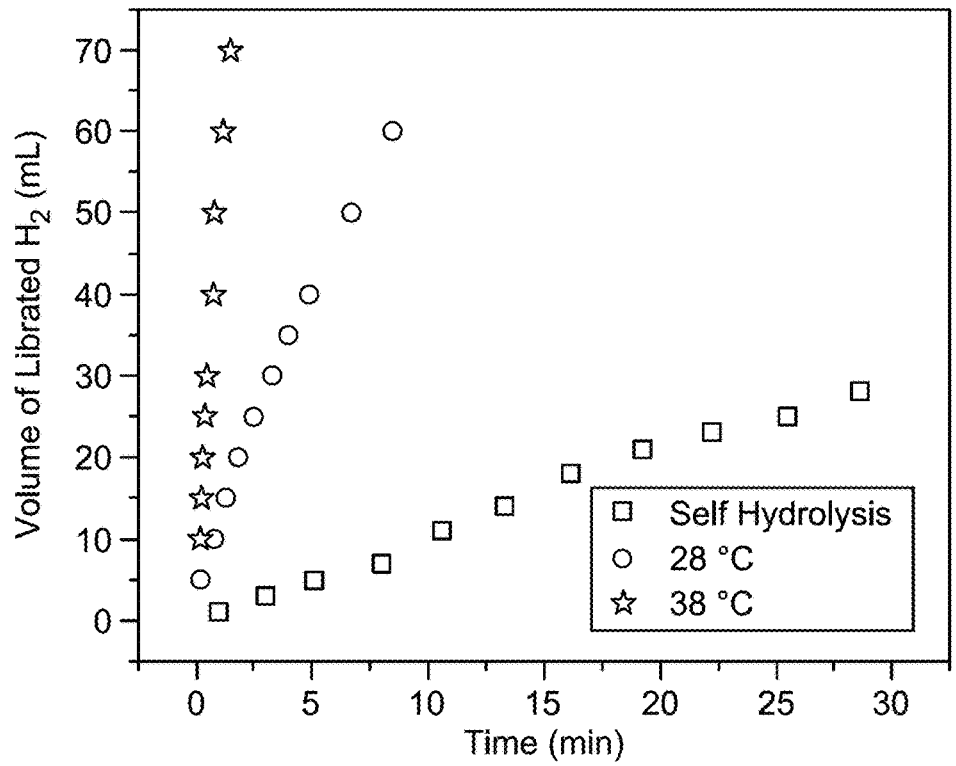
FIG. 5 shows a graph depicting a variation of volume of liberated hydrogen as a function of reaction time with the $Cu_2(OH)_2NO_3/CaSiO_3/g-C_3N_4$ nanocomposite, according to certain embodiments.

Further, FIG. 5 depicts the volume of hydrogen liberated as a function of time from sodium borohydride ($NaBH_4$) hydrolysis with and without $Cu_2(OH)_2NO_3/CaSiO_3/g\text{-}C_3N_4$ catalyst. The catalytic action of the $Cu_2(OH)_2NO_3/CaSiO_3/g\text{-}C_3N_4$ was clearly observed where the catalytic reaction exhibited catalytic activity higher than the self-hydrolysis process. According to the data analysis, hydrogen gas volume rises gradually over time. In addition, there is enhancement in the catalytic hydrolysis reaction with an increase in reaction temperature. The results demonstrate that, on using 0.7 g of $NaBH_4$, values of hydrogen generation rate (HGR) of 275, and 2500 milliliters per minute per gram ($mLmin^{-1}g^{-1}$) were obtained at reaction temperatures of 28°, and 38° C., respectively.

Numerous modifications and variations of the present disclosure are possible in light of the above teachings. It is therefore to be understood that within the scope of the appended claims, the invention may be practiced otherwise than as specifically described herein.

The invention claimed is:

1. A method of hydrogen generation, comprising:
   reacting a sodium borohydride with water in the presence of a $Cu_2(OH)_3NO_3/CaSiO_3/g\text{-}C_3N_4$ nanocomposite to hydrolyze the sodium borohydride, thereby generating hydrogen.

2. The method of claim 1, wherein the hydrogen is generated with a volume rate from 2400 to 2600 milliliters per minute (mL/min) at a temperature of 35 to 40 degrees Celsius (° C.) via hydrolyzing the sodium borohydride with a mass of 0.5 to 1 gram (g).

3. The method of claim 1, wherein the hydrogen is generated with a volume rate from 250 to 300 mL/min at a temperature of 25° to 30° C. via hydrolyzing the sodium borohydride with a mass of 0.5 to 1 g.

4. The method of claim 1, wherein the hydrogen generated after 5 minutes when the sodium borohydride is reacted with water at a temperature of 25° to 30° C. has a volume 5 to 10 times more in the presence of the $Cu_2(OH)_3NO_3/CaSiO_3/g\text{-}C_3N_4$ nanocomposite than in the absence of the $Cu_2(OH)_3NO_3/CaSiO_3/g\text{-}C_3N_4$ nanocomposite.

5. The method of claim 1, wherein the $Cu_2(OH)_3NO_3/CaSiO_3/g\text{-}C_3N_4$ nanocomposite comprises:
   a graphite carbon nitride ($g\text{-}C_3N_4$) in an amount of 20 to 40 percent by weight (wt. %), and
   a copper hydroxide nitrate ($Cu_2(OH)_3NO_3$) in an amount of 20 to 40 wt. %, and
   a calcium silicate ($CaSiO_3$) in an amount of 20 to 40 wt. %,
   based on the total weight of the $Cu_2(OH)_3NO_3/CaSiO_3/g\text{-}C_3N_4$ nanocomposite.

6. The method of claim 1, wherein the $Cu_2(OH)_3NO_3/CaSiO_3/g\text{-}C_3N_4$ nanocomposite is made by a process comprising:
   mixing a calcium silicate ($CaSiO_3$), a graphite-phase carbon nitride ($g\text{-}C_3N_4$), and a copper salt in a glycol solvent to form a mixture;
   microwaving the mixture to form the $Cu_2(OH)_3NO_3/CaSiO_3/g\text{-}C_3N_4$ nanocomposite.

7. The method of claim 6, further comprising:
   forming the $CaSiO_3$ by sonicating a mixture of a calcium salt and a silicate salt in an aqueous alcohol solution to form a calcium silicate mixture, followed by heating the calcium silicate mixture to a temperature of 160° to 200° C. for 1 to 3 hours (h) to form the $CaSiO_3$,
   wherein the calcium salt is selected from a group consisting of calcium nitrate ($Ca(NO_3)_2$), calcium chloride ($CaCl_2$)), calcium phosphate ($Ca_3(PO_4)_2$), calcium carbonate ($CaCO_3$) and calcium citrate ($C_{12}H_{10}Ca_3O$), and wherein the silicate salt is selected from a group consisting of calcium silicate ($Ca_2O_4Si$), sodium silicate ($Na_2SiO_3$), potassium silicate ($K_2SiO_3$), zeolites and micas.

8. The method of claim 6, further comprising:

forming the g-$C_3N_4$ by heating urea to a temperature of 550° to 650° C. for 30 to 60 minutes (min).

9. The method of claim 6, wherein the mixing comprises a copper salt selected from a group consisting of copper nitrate ($Cu(NO_3)_2$), copper chloride ($CuCl_2$), copper sulfate ($CuSO_4$), copper bromide (CuBr) and copper cyanide (CuCN).

10. The method of claim 6, wherein the microwaving is performed at a temperature of 160° to 200° C. at a pressure of 4 to 6 bar for 30 to 90 min.

11. The method of claim 1, wherein the $Cu_2(OH)_3NO_3$/$CaSiO_3$/g-$C_3N_4$ nanocomposite includes a plurality of metal oxides nanorods and a plurality of g-$C_3N_4$ nanosheets.

12. The method of claim 1, wherein the $Cu_2(OH)_3NO_3$/$CaSiO_3$/g-$C_3N_4$ nanocomposite includes the metal oxide nanorods comprising $Cu_2(OH)_3NO_3$ and $CaSiO_3$.

13. The method of claim 1, wherein the $Cu_2(OH)_3NO_3$/$CaSiO_3$/g-$C_3N_4$ nanocomposite includes the metal oxide nanorods of an average length 1 to 3 micrometers (μm).

14. The method of claim 1, wherein the $Cu_2(OH)_3NO_3$/$CaSiO_3$/g-$C_3N_4$ nanocomposite include the metal oxide nanorods comprising nanowires protruding perpendicularly to the nanorods.

15. The method of claim 1, wherein the $Cu_2(OH)_3NO_3$/$CaSiO_3$/g-$C_3N_4$ nanocomposite include the metal oxide nanorods comprising nanowires of a length 10 to 50 nanometer (nm) dispersed on the g-$C_3N_4$ nanosheets with some aggregates of the metal oxide nanorods.

16. The method of claim 1, wherein the $Cu_2(OH)_3NO_3$/$CaSiO_3$/g-$C_3N_4$ nanocomposite has a mesoporous structure with a plurality of wide pores in the g-$C_3N_4$ nanosheets where the metal oxides nanorods deposit.

17. The method of claim 1, wherein the $Cu_2(OH)_3NO_3$/$CaSiO_3$/g-$C_3N_4$ nanocomposite has an average pore diameter of 3 to 7 nanometers (nm).

18. The method of claim 1, wherein the $Cu_2(OH)_3NO_3$/$CaSiO_3$/g-$C_3N_4$ nanocomposite has a Brunauer-Emmett-Teller (BET) surface area of 100 to 200 square meter per gram ($m^2 \cdot g^{-1}$).

19. The method of claim 1, wherein the $Cu_2(OH)_3NO_3$/$CaSiO_3$/g-$C_3N_4$ nanocomposite has a BET surface area of 140 to 160 $m^2 \cdot g^{-1}$.

20. The method of claim 1, wherein the $Cu_2(OH)_3NO_3$/$CaSiO_3$/g-$C_3N_4$ nanocomposite has an average pore volume of 0.3 to 0.4 cubic centimeters per gram ($cm^3 \cdot g^{-1}$).

* * * * *